Patented Sept. 26, 1944

2,359,019

UNITED STATES PATENT OFFICE 2,359,019

METHOD OF PREPARING DIHYDRODIETHYLSTILBESTROL AND RELATED COMPOUNDS

William Braker, Brooklyn, and Edward Pribyl, Astoria, N. Y., assignors to E. R. Squibb & Sons, New York, N. Y., a corporation of New York No Drawing. Application December 31, 1940, Serial No. 372,572

5 Claims. (Cl. 260—619)

This invention relates to, and has for its object the provision of, an efficient method of preparing compounds of the general formula

wherein both R's represent the same member of the group consisting of H and lower-alkyl radicals, and both X's represent the same lower-alkyl radical—notably 3,4 - bis - (p - hydroxy-phenyl) - hexane, or dihydrodiethylstilbestrol.

Dihydrodiethylstilbestrol is a valuable therapeutic agent, possessing estrogenic properties. It has been prepared by working up the products of the demethylation of anethole and by various reduction processes, but the yields have been low and/or the processes expensive.

The method of this invention essentially comprises reacting a compound of the general formula

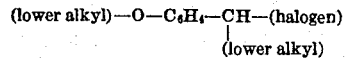

—preferably

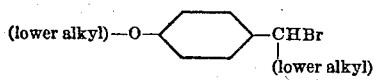

—with a dehalogenating metal—preferably magnesium—and, if desired, converting the resulting bis-(alkoxy-phenyl)-alkane into the corresponding hydroxy compound—preferably by reacting it with a Grignard reagent of the group consisting of CH₃MgI, C₆H₅MgBr, and C₂H₅MgI, and hydrolyzing the reaction product.

The method of this invention will be described in detail in connection with the preparation of dihydrodiethylstilbestrol, the following example being illustrative of the invention:

(a) 52 g. p-(α-bromo-propyl)-anisole in 30 cc. anhydrous ether is added dropwise, with stirring, to a suspension of 2.8 g. magnesium in 30 cc. ether; and the mixture is refluxed for 3 hours, 100 cc. benzene added, and the ether removed by distillation. The resulting precipitate having been dissolved by adding 100 cc. n-butyl ether and heating on a steam bath for 2 hours, the mixture is poured into 500 cc. ice water, the upper liquid layer formed is removed, and the aqueous layer is extracted with two 100-cc. portions of ether. The extracts are combined with the upper layer and dried over sodium sulfate; on removal of the solvents by vacuum-distillation, the residual oily material deposits a solid substance, which is separated by suction filtration and crystallized from ethanol. 1.0 g. of 3,4-bis-(p-anisyl)-hexane, melting at 142° C., is thus obtained.

An additional quantity of 3,4-bis-(p-anisyl)-hexane may be obtained from the oily residue by fractionally distilling it in a vacuum, collecting the fraction boiling at 190-205° C./3 mm., triturating with ethanol, filtering, and crystallizing therefrom. A yield of 2.2 g. of 3,4-bis-(p-anisyl)-hexane melting at 143° C. is thus obtained.

(b) 2.0 g. magnesium is suspended in 25 cc. ether, and 12.0 g. methyl iodide added thereto with stirring. When all of the magnesium has dissolved, 1.6 g. 3,4-bis-(p-anisyl)-hexane is added, the ether removed by distillation, and the residual mixture heated on an oil bath at 160°-180° C. for 20 minutes, during which time gas is evolved in a steady stream. The reaction mixture is then cooled, treated with dilute sodium hydroxide solution, filtered, and acidified with concentrated hydrochloric acid; and the resulting precipitate is filtered, washed with water, and vacuum-dried. Crude dihydrodiethylstilbestrol (M. P. 178-181° C.) is thus obtained in practically quantitative yield. On crystallization from aqueous alcohol and vacuum-drying at 100° C., dihydrodiethylstilbestrol is obtained as a white crystalline substance melting at 182-3° C.

Manifestly, compounds of the general formula

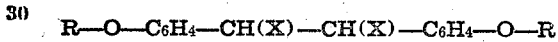

other than

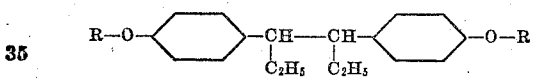

wherein both R's are H or methyl, may be prepared by the procedure of the foregoing example. Thus, homologs of 3,4-bis-(p-anisyl)-hexane and dihydrodiethylstilbestrol, embodying lower-alkyl groups other than ethyl (inter alia, methyl, propyl, and butyl), may be prepared by using the homologous reactants in procedures a and b of the foregoing example. For instance, by using p-(α-bromo-butyl)-anisole in place of p-(α-bromo-propyl)-anisole in procedure a hereinabove, 4,5-bis-(p-anisyl)-octane may be obtained; and by dealkylation of this compound—e. g., by procedure b hereinabove— 4,5-bis-(p-hydroxy-phenyl)-octane may be obtained. The p-(α-bromo-butyl)-anisole may be obtained by reacting anisaldehyde with propyl magnesium halide, and converting the resulting carbinol into the corresponding bromide. Similarly, by using p-(α-bromo-ethyl)-anisole, one may obtain 2,3-bis-(p- anisyl)-butane and 2,3-bis-(-p-hydroxy-phenyl)-butane.

Manifestly, also, dihydrodiethylstilbestrol may be obtained from homologs of p-(α-halo-propyl)-anisole, wherein the methyl of the methoxy group is replaced by other lower-alkyl groups—inter alia, ethyl, propyl, and butyl; and it is obvious that homologs of dihydrodiethylstilbestrol may be obtained by using homologs of p-(α-halo-propyl)-anisole wherein both the propyl and the methoxy group are replaced by other lower-alkyl groups. Furthermore, compounds isomeric with 3,4-bis-(p-anisyl)-hexane, dihydrodiethylstilbestrol, and their homologs—i. e., compounds wherein the alkoxy or hydroxy groups are in meta or ortho position to the linkage between the benzene nuclei—obviously can be obtained by using a correspondingly isomeric reactant in the procedures of the foregoing example.

The magnesium used in procedure (a) of the foregoing example may be replaced by other conventional dehalogenating metals, inter alia, sodium, aluminum, potassium, and zinc, preferably in a form presenting a large surface area.

The dealkylation—procedure (b) of the foregoing example—may also be effected by any conventional means, e. g., by means of hot hydriodic acid, hydrobromic and acetic acids, or alcoholic KOH. Also, ethyl magnesium iodide and phenyl magnesium bromide may be used in place of the methyl magnesium iodide in the preferred dealkylation procedure of the foregoing example.

The invention may be variously otherwise embodied, within the scope of the appended claims.

We claim:

1. The method of preparing a compound of the general formula

R—O—C$_6$H$_4$—CH(X)—CH(X)—C$_6$H$_4$—O—R wherein both R's represent the same lower-alkyl radical, and both X's represent the same lower-alkyl radical, which comprises reacting a compound of the general formula

with magnesium.

2. The method of preparing a compound of the general formula

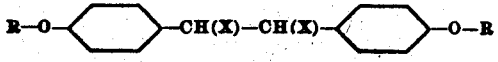

wherein both R's represent the same lower-alkyl radical, and both X's represent the same lower-alkyl radical, which comprises reacting a compound of the general formula

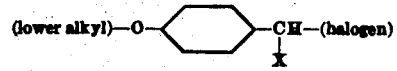

with magnesium.

3. The method of preparing a compound of the general formula

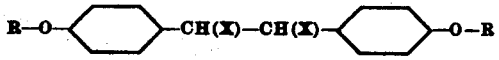

wherein both R's represent the same lower-alkyl radical, and both X's represent the same lower-alkyl radical, which comprises reacting a compound of the general formula

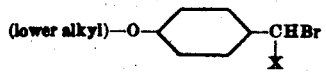

with magnesium.

4. The method of preparing a compound of the general formula

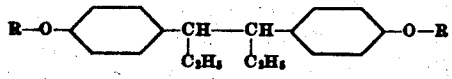

wherein both R's represent the same lower-alkyl radical, which comprises reacting a compound of the general formula

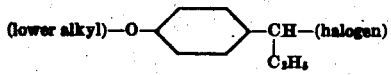

with magnesium.

5. The method of preparing 3,4-bis-(p-anisyl)-hexane which comprises treating p-(α-bromo-propyl)-anisole with metallic magnesium.

WILLIAM BRAKER.
EDWARD PRIBYL.